Feb. 15, 1944. R. R. RANEY ET AL 2,341,813
PLANTER
Filed June 30, 1942 5 Sheets-Sheet 1
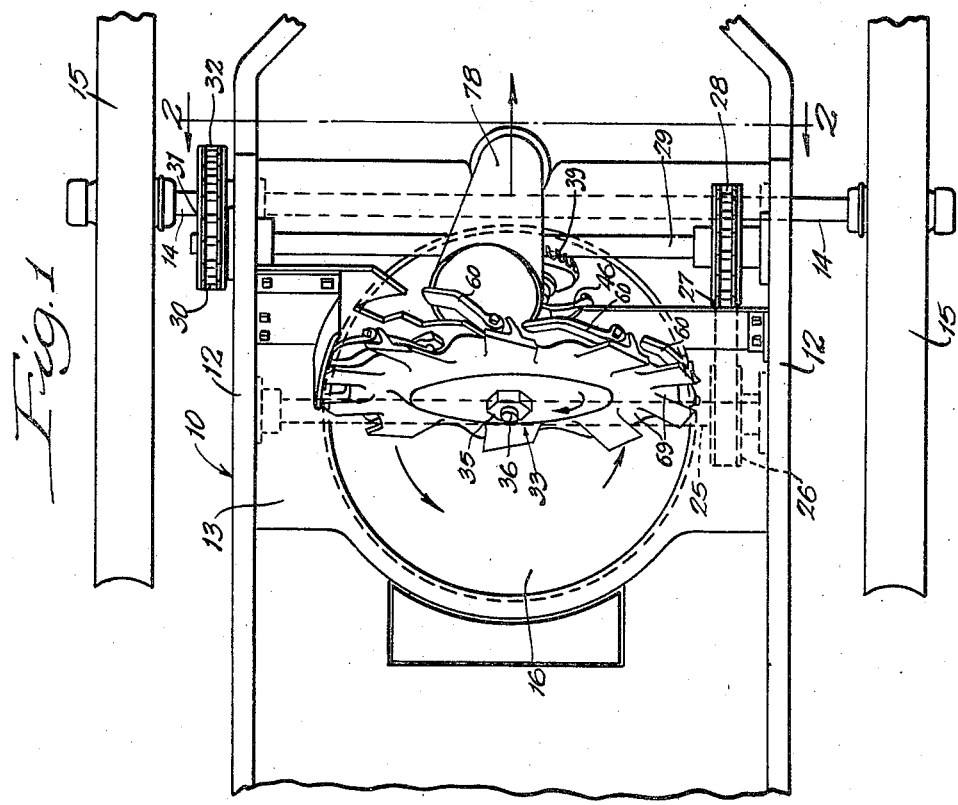
Inventors:
Russell R. Raney and
James H. Bornzin,
By Paul O. Pippel
Attorney.

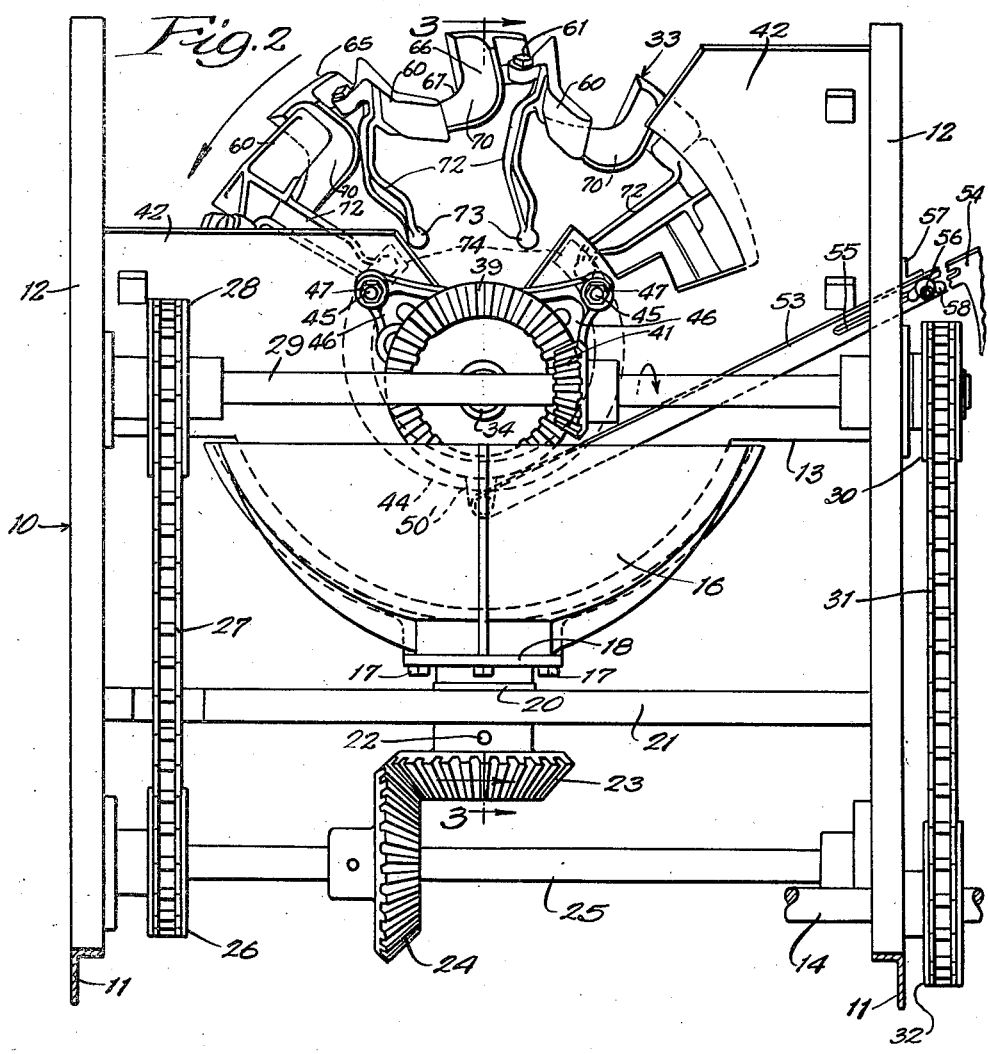

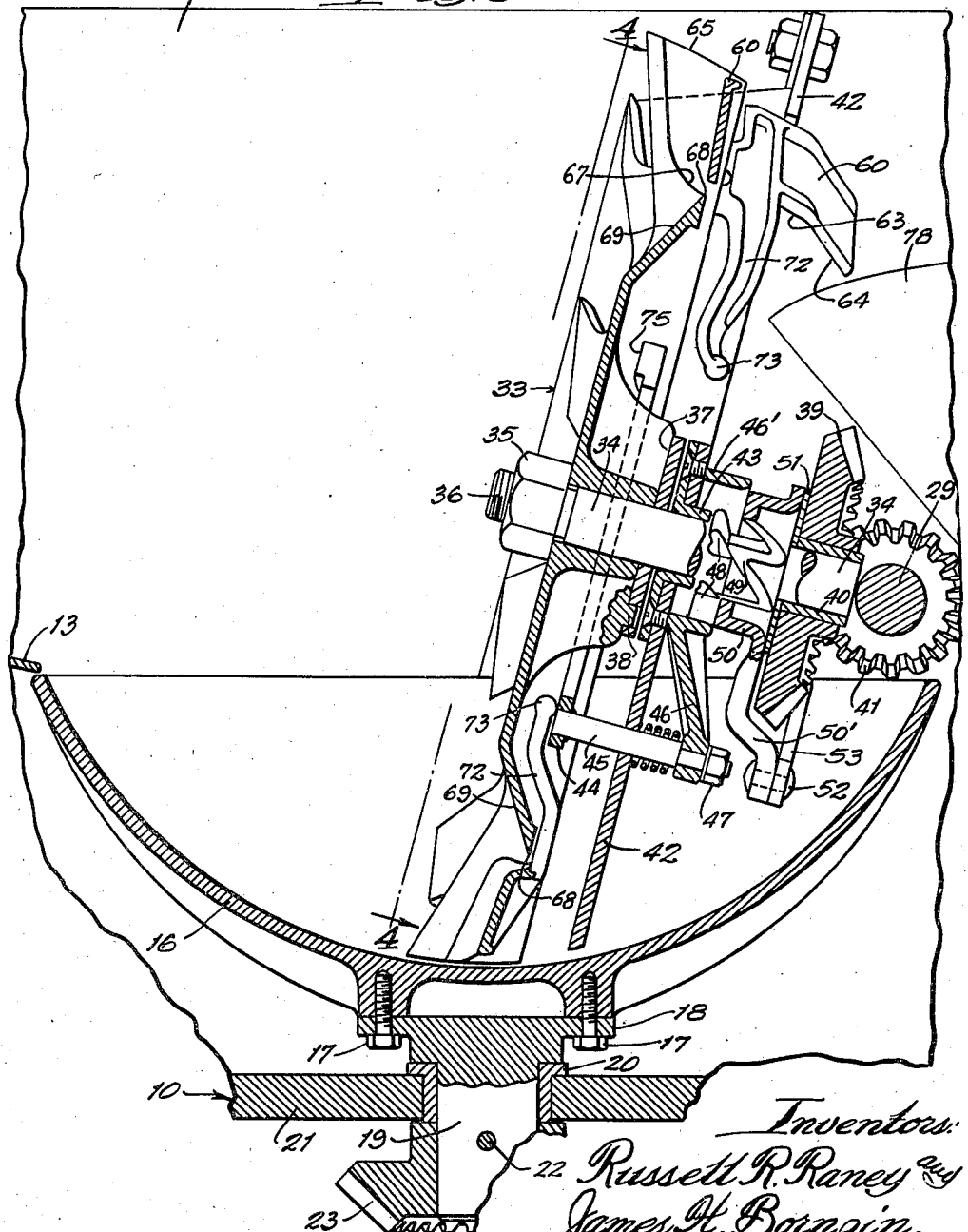

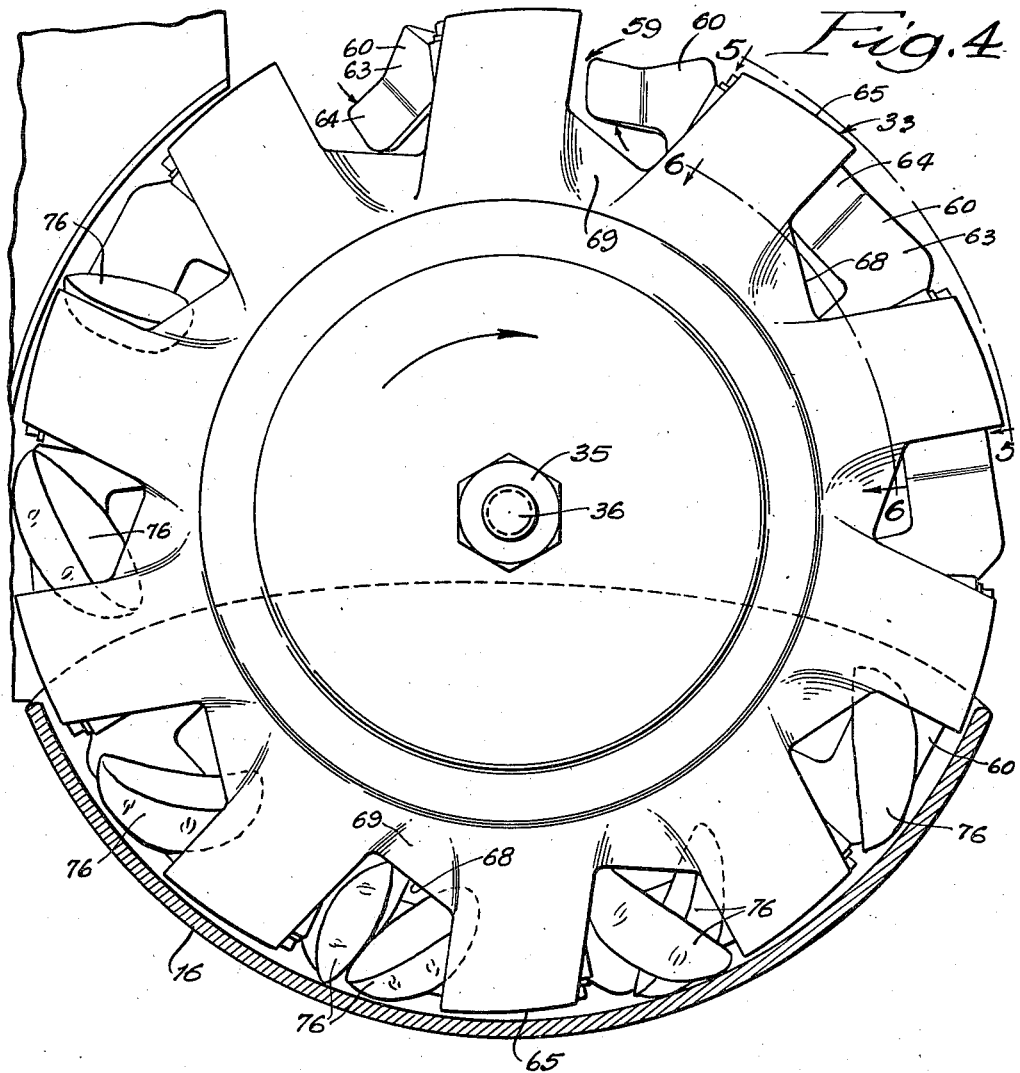

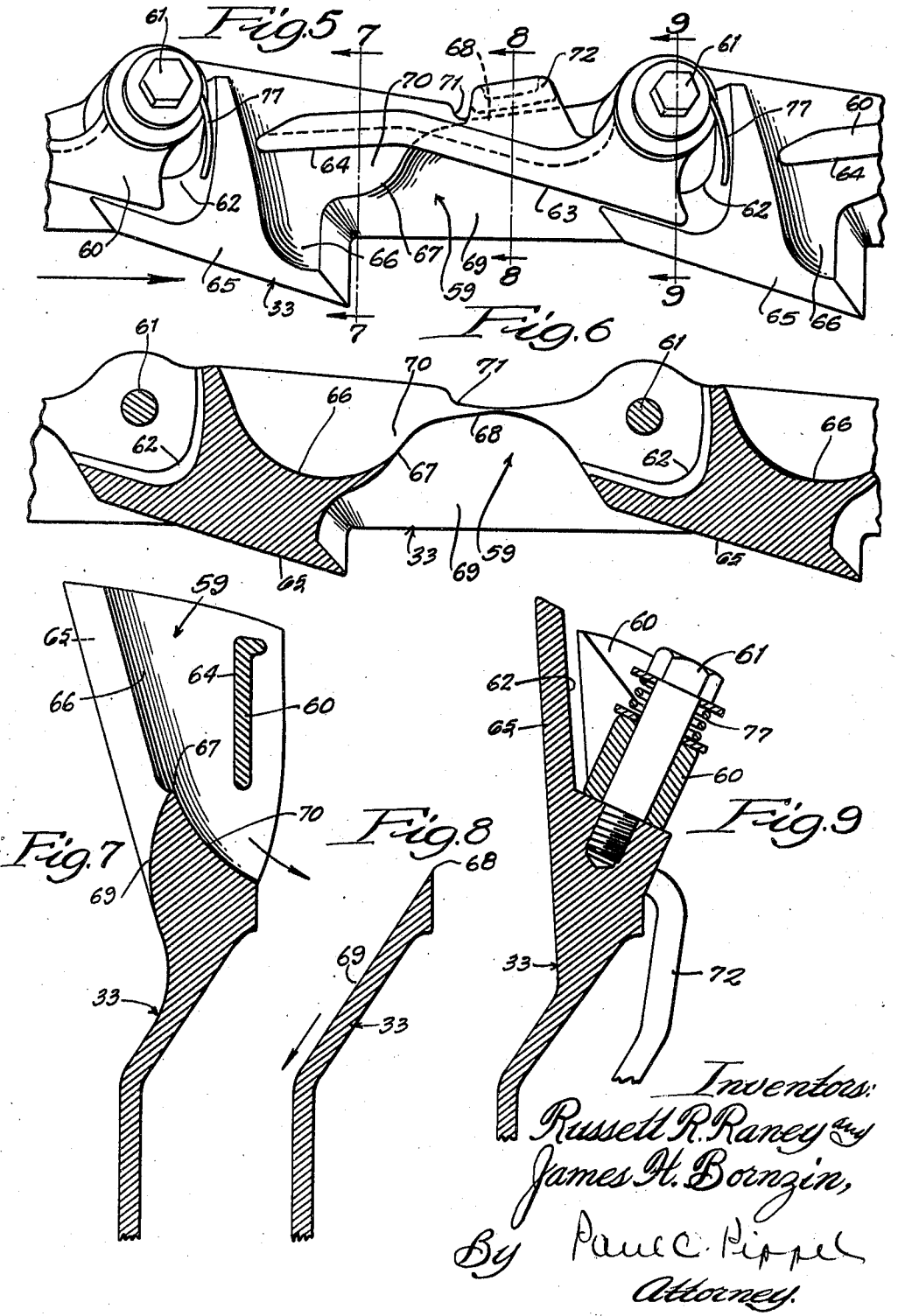

Patented Feb. 15, 1944

2,341,813

UNITED STATES PATENT OFFICE 2,341,813

PLANTER

Russell R. Raney, La Grange, and James H. Bornzin, Chicago, Ill., assignors to International Harvester Company, a corporation of New Jersey Application June 30, 1942, Serial No. 449,142

15 Claims. (Cl. 221—113)

This invention relates to a planter of the type having a rotating seed plate provided with pockets for seeds. More specifically it is of the type in which the rotating seed plate dips into a rotating seed bowl from which it takes seeds.

In a planter of the above type when adapted for planting potatoes, it frequently happens that the pockets in the seed plate receive more than one seed. This is particularly true when the size of the seeds vary. Consequently, it is desirable to provide in a planter of this type some means for preventing the seed pockets from taking more than one seed and for varying the size of the pockets to accommodate seeds of different sizes.

An object of the present invention is to provide an improved planter.

A further object is the provision of an improved rotating seed plate for a planter.

Another object is the improvement in a planter of the type comprising a rotating seed plate and a rotating bowl into which the seed plate extends.

Still another object is to provide an improved seed pocket for a seed plate.

Other objects will appear from the disclosure.

The planter of the present invention comprises a rotating seed plate and a rotating seed bowl into which the seed plate extends. The improvement in this planter lies in the shaping of the seed pockets of the seed plate in such a manner that each pocket discharges only a single seed. Planters of this type also include closure members for the seed pockets, and a further improvement in the present invention lies in the provision of an adjustable cam ring which may adjust the closed position of the closure members for accommodating seeds of various sizes.

In the drawings:

Figure 1 is a plan view of the planter of the present invention;

Figure 2 is a front vertical view of the planter taken on the line 2—2 of Figure 1;

Figure 3 is a vertical sectional view of the planter taken on the line 3—3 of Figure 2;

Figure 4 is a plan view of the seed plate of the planter as indicated by the line 4—4 of Figure 3;

Figure 5 is an end view of a portion of the seed plate as indicated by the line 5—5 in Figure 4;

Figure 6 is a sectional view of a portion of the seed plate as indicated by the line 6—6 in Figure 4;

Figure 7 is a sectional view taken on the line 7—7 of Figure 5;

Figure 8 is a sectional view taken on the line 8—8 of Figure 5;

Figure 9 is a sectional view taken on the line 9—9 of Figure 5; and

Figure 10 is a plan view of a modified form of planter.

The reference character 10 designates the framework of the planter of the present invention. This framework includes horizontal side members 11 in the form of angle irons, vertical side members 12, and a floor 13 extending between the side members 11. The planter frame 10 is supported upon an axle 14 which is supported in turn on wheels 15. The planter also includes a rotating seed bowl 16 secured by bolts 17 to a support 18 having a shaft extension 19 journaled in a bearing 20 mounted in cross member 21 also forming part of the frame 10. Secured to the lower end of the shaft portion 19 by a pin 22 is a bevel gear 23 which meshes with a bevel gear 24 secured to a transverse shaft 25. Secured to the shaft 25 is a sprocket 26 driven by a sprocket chain 27 in turn by a sprocket 28 secured to a transverse shaft 29. Also secured to the shaft 29 is a sprocket 30 driven by a chain 31 driven in turn by a sprocket 32 mounted upon the axle 14 and driven thereby. A seed plate 33 is secured to a shaft 34 between a nut 35 threaded upon a threaded portion 36 of the shaft 34 and a collar 37 secured to the shaft. The seed plate 33 has projections 38 of which only one is shown, which as in Figure 3 fit into recesses in the collar 37 to prevent relative rotation between the seed plate and shaft. At the other end of the shaft 34 a bevel gear 39 is secured upon a collar 40 secured in turn to the end of the shaft 34. The bevel gear 39 meshes with a bevel gear 41 secured to the transverse shaft 29. In this way drive is transmitted from the shaft 29 to the seed plate 33. It will be observed that the lower end of the seed plate 33 extends into the seed bowl 16 and that the seed plate is at a slight angle to the vertical. The seed plate 33 rests against a transverse plate 42 which is generally parallel to the seed plate and extends between the vertical members 12. A collar 43 secured to the plate 42 serves as a bearing for the shaft 34 and also serves to receive the thrust of the collar 37 to which the seed plate 33 is secured. It will be observed from the sectioning of the seed plate 33, as indicated in Figure 3, that the under side thereof is somewhat concave. Positioned within the concave under side of the seed plate 33 is a cam ring 44 secured to the ends of three rods 45 equally spaced about the shaft 34, as indicated in Figures 2 and 3. The rods 45 extend through the plate 42 and extend through arms 46 of a member 46' and are secured thereto by nuts 47. The member 46' extends about the shaft 34 and carries wedge-shaped elements 48 which are engaged by wedge-shaped elements 49 of a member 50 also positioned upon the shaft 34. The member 50 rests against a loose washer 51. The member 50 has an arm 50' to which is pivotally connected by a rivet 52 a control member 53. The control member 53 extends laterally to the side of the planter and has a handle portion 54 at its end at the side of the planter. It also has a slot 55 receiving a bolt 56 attached to a piece 57 secured to one vertical member 12. The position of the control member 53 may be adjusted by the handle portion 54, the slot 55 permitting necessary movement. The control member may be fixed in any position by a wing nut 58 on the bolt 56. Adjustment of the control member 53 produces an angular movement of the member 50, and this in turn causes a movement of the member 46' along the shaft 34, since the rods 45 acting through the plate 42 prevent rotation of the member 46', and the coaction of the wedge elements 48 and 49 necessarily brings about a displacement of the member 46. The movement of the member 46' along the shaft 34 produces corresponding movement of the cam ring 44, the purpose of which will be described presently.

As seen in Figures 4 to 9, inclusive, the seed plate 33 has a plurality of seed-receiving pockets in its periphery, each pocket being formed of an opening 59 in the plate and a closure member 60 pivotally mounted upon the plate to hold the opening 59 either closed or open. The closure member 60 is pivotally mounted upon a bolt 61 secured to the plate 33 as shown in Figure 9. The bolt 61 is at the rear or under side of the plate 33 and at the right side of the opening 59 as viewed in Figures 5 and 6. The plate is cut away, as indicated at 62, to accommodate the closure member 60. The closure member 60 is so shaped as to present toward the seed plate 33 a first generally planar surface 63 adjacent the right side of the opening 59 and a generally planar surface 64 adjacent the left side of the opening 59. The surfaces 63 and 64 are so related as to constitute a generally concave side of the closure member 60. The arrow in Figure 5 indicates the direction of rotation of the plate 33, and it will be seen that there is a surface 65 to the right of the right end of the opening 59 which extends generally outwardly from the upper or front face of the seed plate in the direction of rotation and thus provides a slope facilitating the entry of seeds in the pocket formed by the opening 59 and the closure member 60. The under or rear side of the plate 33 is cut away at the left side of the opening 59 as indicated at 66, and the end portion of the closure member 60 including the surface 64 is received at the cut-away portion 66 so that the end portion is in overlapping relationship with the seed plate at the left side of the opening 59. It will be observed from Figure 4 that the bottom of the opening 59 slopes downwardly toward the side at which the closure member 60 is mounted so that the bottom is closer to the axis of rotation of the seed plate 33, at the side of which the closure member is pivoted, than at the other side. The bottom of the opening presents an edge having a portion 67 extending from the left side of the opening 59 somewhat toward the rear or under side of the plate 33 and a portion 68 extending more generally along the rear or under side of the plate to the right side of the opening 59. The plate is cut away in front of the portions 67 and 68 of the edge, as indicated at 69, so as to slope downwardly toward the center of the plate. The plate is also cut away rearwardly of the portion 67 of the edge, as indicated at 70, so as to slope downwardly and rearwardly from the edge portion 67. Thus a pocket for seed is formed in a space defined by the cut-away portion 66 at the left side of the opening 59, the planar front surface of the closure member 60, the edge portion 67, and the part of the cut-away portion 70 between the planar surface 64 and an edge portion 67. This space should normally be of a size to hold, for example, potato seed, and the size of the space may be adjusted by adjustment of the closure member 60 with respect to the plate 33.

It will be observed in Figures 5 and 6 that the rear side of the plate 33 is cut away, as indicated at 71, adjacent the edge portion 68 so as to provide space for an arm portion 72 formed on the closure member 60. As seen in Figure 3, the arm 72 extends from the closure member 60 first generally toward the shaft 34, then somewhat within the concave under side of the plate 33 and again toward the shaft 34, terminating in a rounded end 73 forming a follower portion engaging the cam 44. The cam 44 is of circular ring shape except for a cut-out portion at the top thereof, as indicated by the reference character 74 (Figure 2). The cam ring 44 has a raised part 75, as shown in Figure 3, at the right side of the cut-out portion 74, as viewed in Figure 2. The position of the cam ring 44 determines the position of the closure member 60, the closer the cam ring 44 to the seed plate 33 the smaller the pocket formed between the closure member 60 and the opening 59. The raised portion 75 has the effect of adjusting each closure member during a portion of the revolution of the seed plate so that the pocket is momentarily made smaller at this part of the revolution.

The concave shape of the under side of seed plate 53, the positioning of the cam ring 44 within the said concave side, the small diameter of the cam ring 44 as compared with the large diameter of the seed-receiving pockets in the seed plate 33, and the inwardly extending arms 72 on the closure members 60 all serve to permit adjustment of the cam ring 44 with respect to the seed plate 33, whereby adjustment of the size of the seed-receiving pockets is effected. Since the cam ring 44 is inward of the seed-receiving pockets, there is room for substantial adjustment of the cam ring 44, and yet the seed plate 42 may contact the stationary transverse plate 42 for support. The positioning of the cam ring 42 inward of the closure members 60 on the seed plate 33 is made possible by the concave shape of the under side of the seed plate 33 and the radially inwardly extending arms 72 controlling the closure members 60 by the cam ring 42.

In operation, potato seeds are placed in the seed bowl 16 rotating in the direction indicated by the arrows in Figure 1. The seed plate 33 rotates in the direction of the arrow in Figure 4 and seeds 76 are picked up by the pockets in the plate, and as pockets pass through the bottom of the seed bowl, they may each pick up more than one seed as indicated, and as the pockets move upwardly at the left, as in Figure 4, the extra seed drops from each pocket so that only one seed is left, for as each pocket moves nearer to the top of the elevation, the extra seed will fall back into the bowl 16 because of the cut-away portion 69. As each pocket moves toward the top position, the cam follower portion 73 of the closure member 60 comes into contact with the raised portion 75, and thus the size of the pocket is momentarily reduced so that there is a greater tendency for the elimination of the extra seed. As the cam follower 73 reaches the cut-away portion 74 of the cam ring 44, a spring 77 mounted upon the bolt 61 acts to move the closure member 60 rearwardly to open the seed pocket and thus to discharge the seed. The seed may easily fall down the cut-away portion 70 to the rear of the edge portion 67. Each seed as it falls from the seed plate 33 is discharged into a tube 78 through which it falls to the ground.

If the size of the potato seeds change, then the size of the pockets may be changed by adjustment of the control member 53. This brings about a relative angular movement of the member 50, and such movement produces movement of the member 46 along the shaft 34 with a consequent movement of the cam ring 44.

The shapes of the pockets formed in the seed plate are a very important part of the present invention. The sloping surface 65 facilitates the passage of the seeds into the seed plate as the seed plate passes into the seed bowl 16. There is a pocket of considerable size formed between the closure member 60 and the cut-away portions 66, 69, and 70. The very size of the pocket facilitates the picking up of seeds. Of course, the large size may cause more than one seed to be picked up, but, as the pockets move out of the bowl and upwardly to a top position, the pocket is in effect reduced in size, since the seeds slide downwardly along the cut-away portion 69, and the only effective pocket left is that formed by the surface 64 on the closure member 60 and the cut-away portions 66 and 70. The momentary reduction in the size of this pocket produced by the raised portion 75 on the cam ring 44 also serves to dislodge any extra seed from the pocket without dislodging the one remaining seed which it is desired to discharge through the tube 78 as the pocket opens. The angular relationship of the front surfaces 63 and 64 on the closure member 60 permits the surface 64 to be at an angle which is best suited to the reception of a single seed into the pocket formed by the surface 64 and the cut-away portions 66 and 70. The slope of the cut-away portion 70, as seen in Figure 7, facilitates the discharge of a seed into the tube 78 when the closure member 60 is swung open.

As viewed in Figure 4, the edge 68 at the bottom of the opening 59 slopes downwardly in the direction of rotation or is closer to the center of rotation at the right side of the opening where the closure member 60 is pivoted than at the other side of the opening. The reason is this: The closure member 60 must swing away from the opening 59 somewhat before the opening reaches its theoretical top position, for otherwise the tangential forces acting on the seed will not allow it to be discharged directly down the tube 78. Since the tangential forces tend to throw the seed laterally, it must be discharged before it reaches the tube or, in other words, before it reaches the theoretical top positon. At this discharge point in advance of the top position the bottom of the opening 59 will slope upwardly unless it is nearer the center of rotation at the forward side of the opening than at the other side. An upward slope would hinder discharge of the seed. Figure 4 shows the closure member 60 opening before the opening 59 has reached the theoretical top. The bottom 68 of the opening 59 slopes slightly downwardly and the seed is discharged easily.

Figure 10 illustrates a modified form of planter. This planter includes like that of Figure 1 side frame members 12, floor 13, axle 14, and wheels not shown. However, the seed plate 33 is not positioned transverse to the direction of travel of the planter over the ground but at a considerable angle to the transverse, the angle shown being approximately 30° although this angle is not critical. The seed plate is driven by a bevel gear 39 which is in turn driven by a bevel gear 41 secured to a transverse shaft 29. This shaft is driven by a sprocket 30 in turn driven by a chain 31 driven by a sprocket 32 secured to the anxle 14. It will be observed from Figure 10 that the top of the seed plate is somewhat displaced laterally from the longitudinal center line of the planter extending through the center of the seed bowl 16. When seed is discharged from the seed plate 33, in accordance with both Figures 1 and 10, tangential forces upon the seed produced by the seed plate 33 tend not merely to allow the seed to drop but to move it in the direction of rotation of the plate, that is, transversely of the line of travel of the machine. Thus in the modification of Figure 1, it is necessary to discharge the seed from the seed pockets before they reach the top position in order that the seed under the influences of the tangential forces may fall more or less directly downwardly through the tube 78. It is desirable to discharge the seeds from the seed plate as near to the top position as possible in order that there may be the greatest opportunity for any extra seed to fall back into the seed bowl 16 before opening of the seed pocket. This opportunity may be realized in the modification of Figure 10, for the top position of the seed plate is sufficiently displaced from the longitudinal center line of the planter through the seed bowl so that the seed may fall almost straight down through the tube 78.

The intention is to limit the invention only within the scope of the appended claims.

What is claimed is:

1. In a planter comprising a frame, a seed bowl rotatably mounted thereon, a seed-receiving plate mounted on the frame for rotation about an axis at a substantial angle to that of the bowl and extending into the bowl, said plate having seed-receiving pockets formed of openings in the plates and closure members for the openings movably mounted on the plate, the combination therewith of a drive shaft for the plate secured thereto and extending therefrom, a driving gear for the drive shaft secured thereto in spaced relation to the plate, a cam ring having a cut-out portion and being mounted on the frame adjacent the plate between the plate and the gear so as to contact the closure members except at the cut-out portion, a first member having wedge elements positioned on the shaft so as to rest against the gear, a second member connected with the cam ring and having wedge elements engaging the wedge elements of the first member and positioned on the shaft, whereby a relative angular movement between the members causes the wedge elements thereof to shift the second member and the cam ring along the shaft to adjust the closure members with respect to the plate for varying the size of the seed-receiving pockets therein.

2. A planter comprising a frame, a seed bowl rotatably mounted thereon, a seed-receiving plate mounted on the frame for rotation about an axis at a substantial angle to that of the bowl and extending into the bowl, said plate having seed-receiving pockets formed of openings in the plates and closure members for the openings movably mounted on the plate and having cam-follower arms extending generally toward the axis of rotation of the plate, a drive shaft for the plate secured thereto and extending therefrom, a driving gear for the drive shaft secured thereto in spaced relation to the plate, a cam ring having a cut-out portion and being mounted on the frame adjacent the plate between the plate and the gear so as to contact the ends of the cam-follower arms except at the cut-out portion, a first member having wedge elements positioned on the shaft so as to rest against the gear, a second member connected with the cam ring and having wedge elements engaging the wedge elements of the first member and positioned on the shaft, whereby a relative angular movement between the members causes the wedge elements thereof to shift the second member and the cam ring along the shaft to adjust the closure members with respect to the plate for varying the size of the seed-receiving pockets therein.

3. A planter comprising a frame, a seed bowl rotatably mounted thereon, a seed plate rotatable on an axis at a substantial angle to that of the bowl and extending into the bowl and having seed-receiving pockets formed of openings in the plate and closure members movably mounted on the plate and having cam-follower arms extending generally inwardly toward the axis of rotation of the plate, a support secured to the frame parallel to the plate, a drive shaft for the plate secured thereto and journaled on the support and extending therethrough, a drive gear secured to the shaft in spaced relation to the support at the side thereof opposite the plate, a cam ring having a cut-out portion and positioned between the plate and the support to contact the ends of the cam-follower arms except at the cut-out portions, a first member having wedge elements and positioned on the shaft at the side of the support opposite the plate, means extending through the support to connect the first member and the cam ring and to prevent rotation thereof, a second member having wedge elements engaging those of the first member and being positioned on the shaft so as to rest against the gear, whereby angular movement of the second member causes the wedge elements of the members to shift the first member and the cam ring along the shaft for adjusting the closure members on the plate for varying the size of the pockets in the plate.

4. A planter comprising a frame, a seed bowl rotatably mounted thereon, a seed-receiving plate mounted on the frame for rotation about an axis at a substantial angle to that of the bowl and extending into the bowl, said plate having seed-receiving pockets formed of openings in the plates and closure members movably mounted on the plates, said pockets being adapted to pick up seeds from the bowl as they pass into the bowl and to discharge the seeds upon opening of the closure members when the pockets are out of the bowl, a cam ring having a cut-out portion and contacting the closure members to hold them closed, the closure members opening to discharge seeds from the pockets upon reaching the cut-out portion, the cam ring having a raised portion adjacent the cut-out portion for moving the closure members to reduce the size of the pockets to drop extra seeds back into the bowl immediately before opening of the closure members.

5. The combination with a horizontal rotating seed bowl of a generally vertical rotating seed plate extending into the bowl and having seed pockets for receiving seeds at one side of the plate, said seed pockets being formed of openings in the plate and closure members movably mounted at the openings to close the same, the surfaces of the plate at the seed-receiving side thereof sloping inwardly toward the openings in the direction opposite the direction of rotation of the plate for facilitating the picking up of seeds by the pockets, the seed-receiving side being the forward side in the direction of rotation of the seed plate.

6. The combination with a horizontal rotating seed bowl of a rotating seed plate positioned over the bowl at a slight angle to the vertical so as to extend into the bowl at its lower edge and to have a lower side and an upper seed-receiving side, the seed plate having a plurality of seed-receiving pockets adapted to take seeds from the bowl upon passing thereinto, each seed-receiving pocket being formed of an opening in the periphery of the plate and a closure member pivotally mounted upon the lower side of the seed plate at one side of the opening to close the opening for receiving and holding seed in the pocket and for opening the opening for discharging seed from the pocket, the portion of the plate at the other side of the opening being cut away at the lower side of the plate, the bottom of the opening presenting an edge extending from the upper side of the plate and the said other side of the opening generally toward the lower side of the plate and the said one side of the opening, the end of the closure member overlapping the said other side of the opening so as to make a seed pocket of the cut-out portion at the said other side of the opening at the lower side of the plate, the edge presented by the bottom of the opening because of its shape as described serving to limit the seed pocket generally to the overlap between the closure member and the said other side of the opening.

7. In the combination as defined in claim 6, the bottom of the opening extending downwardly in a direction toward the one side of the opening upon which the closure member is mounted so as to be closer to the center of rotation of the seed plate at the said one side of the opening than at the other side thereof.

8. In the combination as defined in claim 6, the closure member being so shaped as to have the surface thereof presented toward the seed plate of generally concave form.

9. In the combination as defined in claim 6, the bottom of the opening extending downwardly in a direction toward the one side of the opening upon which the closure member is mounted so as to be closer to the center of rotation of the seed at the said one side of the opening than at the other side thereof, the closure member being so shaped as to have the surface thereof presented toward the seed plate of generally concave form.

10. In the combination defined in claim 6, the closure member being so shaped as to have the side thereof presented toward the seed plate formed of a first generally planar surface at the part adjacent the side at which the closure member is mounted and a second generally planar surface extending at an obtuse angle from the first planar surface in overlapping relation with the other side of the opening in the plate.

11. In the combination as defined in claim 6, the bottom of the opening extending downwardly in a direction toward the one side of the opening upon which the closure member is mounted so as to be closer to the center of rotation of the seed at the said one side of the opening than at the other side thereof, the closure member being so shaped as to have the side thereof presented toward the seed plate formed of a first generally planar surface at the part adjacent the side at which the closure member is mounted and a second generally planar surface extending at an obtuse angle from the first planar surface in overlapping relation with the other side of the opening in the plate.

12. A planter comprising a frame, means for moving the frame over the ground in a certain direction, a rotating horizontal seed bowl, a rotating plate positioned above the bowl so as to be inclined slightly to the vertical and to extend into the bowl and having pockets adapted to be closed during the greater portion of the revolution of the plate for receiving seeds from the bowl and to be opened for a small part of the revolution for discharging seeds, and means mounting the plate at a substantial angle to right angles to the direction of travel for causing the top point of the seed plate to be displaced transversely of the direction of travel from a longitudinal center line through the center of the seed bowl, whereby the pockets at the top of the plate may be opened for discharging seed for giving maximum opportunity to extra seeds to fall from the pockets back into the bowl before opening of the pockets, and the discharge of the seeds at the top of the plate displaced from the longitudinal center line permits the seeds to fall on the longitudinal center line in spite of the tangential forces applied to the seeds by the rotating seed plate.

13. A planter comprising a support, a rotatable seed member engaging the support at one portion and being spaced from the support at another portion, the seed member having a plurality of seed pockets formed of openings in the member and closure parts movably mounted on the member, cam means positioned between the support and the seed member at the portion of the seed member spaced from the support and engageable with the closure parts to cause the seed pockets to be closed and open at predetermined points on the rotation of the seed member, and means mounting the cam means on the support for adjusting the cam means with respect to the support and the seed member to adjust the closure parts for varying the size of the seed pockets on the seed member.

14. A planter comprising a support, a rotatable seed member mounted on the support and having a plurality of pockets formed of openings in the member and closure parts movably mounted on the member, the closure parts carrying follower elements extending radially inwardly from the closure parts, cam means positioned radially inwardly of the closure members so as to engage the follower elements thereof to cause the seed pockets to be closed and open at predetermined points in the rotation of the seed member, and means mounting the cam means on the support for adjusting the cam means with respect to the support and the seed member to adjust the closure parts for varying the size of the seed pockets on the seed member.

15. A planter comprising a support, a rotatable seed member having a hub extending from one side thereof into contact with the support so as to be supportable thereagainst, the seed member having seed pockets at its periphery formed of openings in the plate and closure parts movably mounted in the openings, the seed member being concave at the side from which the hub extends so as to present a space radially inward of the seed pockets, follower elements carried by the closure parts and extending radially inwardly into the said space, cam means radially inward of the seed pockets and engageable with the follower elements so as to cause the seed pockets to be closed and open at predetermined points in the rotation of the seed member, and means mounting the cam means on the support for adjusting the cam means within the said space.

RUSSELL R. RANEY.
JAMES H. BORNZIN.